UNITED STATES PATENT OFFICE.

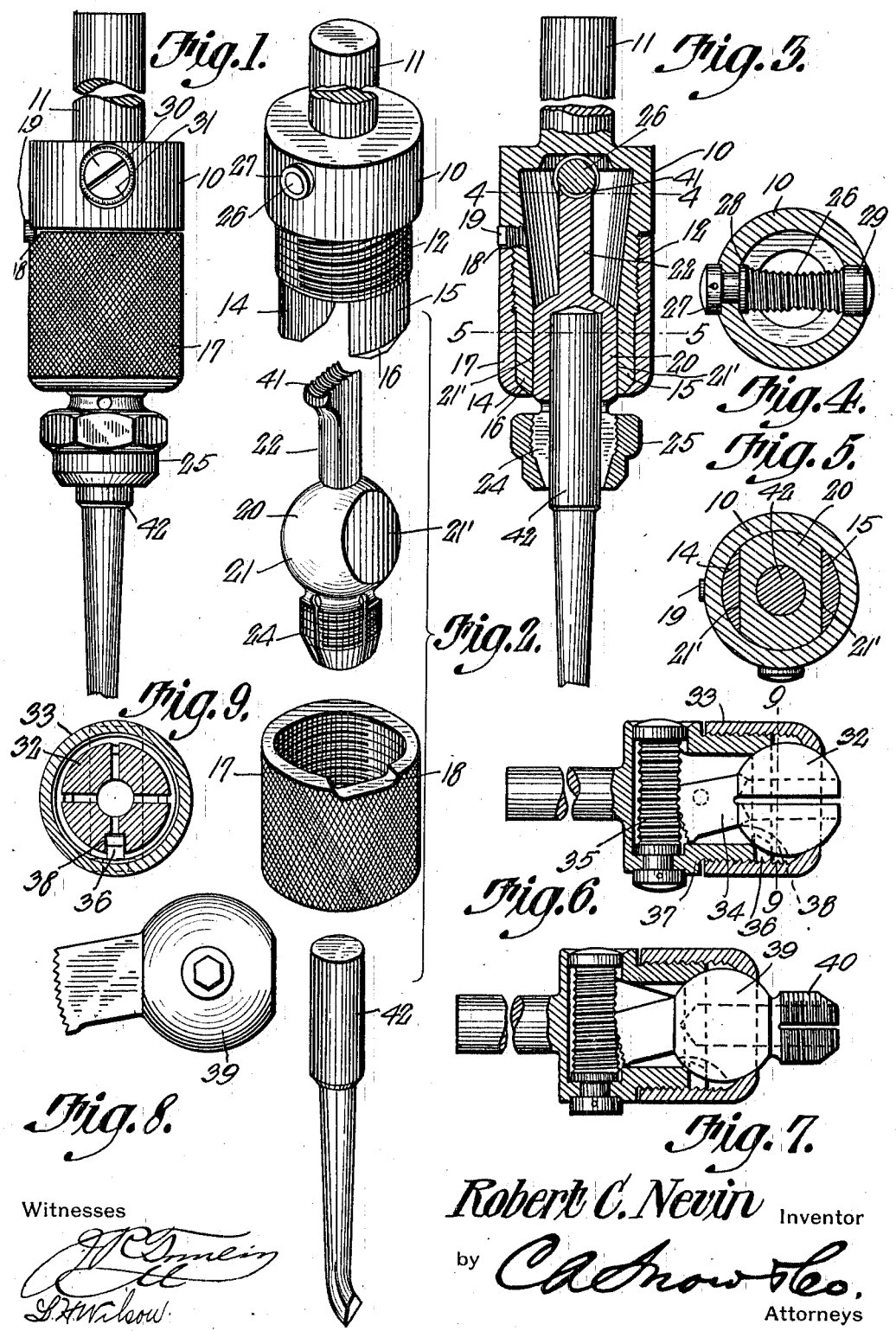

ROBERT C. NEVIN, OF LANSING, MICHIGAN.

BORING-TOOL.

1,059,335. Specification of Letters Patent. Patented Apr. 15, 1913.

Application filed June 15, 1912. Serial No. 703,959.

*To all whom it may concern:*

Be it known that I, ROBERT C. NEVIN, a citizen of the United States, residing at Lansing, in the county of Ingham and State of Michigan, have invented a new and useful Boring-Tool, of which the following is a specification.

This invention relates to an improvement in boring tools.

The primary object of the invention is to provide a tool holder for use where the work is stationary and the spindle of the machine revolves carrying the boring head and the cutting tool, with means whereby the tool may be adjusted without removing the same from the head or removing the head from the machine.

In the drawings: Figure 1 is an elevation. Fig. 2 is a perspective view of the parts disassembled. Fig. 3 is an elevation partly in section. Fig. 4 is a section taken on the line 4—4 of Fig. 3. Fig. 5 is a section on the line 5—5 of Fig. 3. Fig. 6 is a view showing a slightly modified form. Fig. 7 is a view showing a still further modification. Fig. 8 is a detail view of the tool holder shown in Fig. 7. Fig. 9 is a section on the line 9—9 of Fig. 6.

In the drawings 10 designates the head which is provided with the shank 11 which is supported by the machine in the usual manner. The head 10 is provided with the reduced screw threaded extension 12 which is formed with the diagonally disposed extensions 14 and 15, these extensions being formed with the curved surfaces 16. The head is embraced by the sleeve 17 which is interiorly screw threaded and exteriorly knurled, one of its ends being formed with the recess 18. A screw 19 is supported by the head, said screw being disposed within the recess 18, the same limiting the movement of the sleeve on the head. The tool holder 20 is arranged within the head, said tool holder being formed with the substantially spherical body portion 21 which is formed with the flat surfaces 21' which are disposed between the extensions 14 and 15 of the head 10, the tool holder thus being supported to move between said extensions. The tool holder is formed with the tail piece 22 which terminates in the threaded transversely disposed extension 41. The tool is received by the slotted exteriorly screw threaded portion 24 of the holder, this portion being embraced by the nut 25 the tool in this manner being held against displacement. The tail piece 22 extends within the head and is engaged by the transversely disposed screw 26 which is rotatably supported by the head, the thrust collars 27 and 28 forming a bearing for the screw. The screw is rotated by the head 29, the portion of the head 10 adjacent the screw head being provided with graduations 30, the screw being formed with indicating lines 31. It will be noted by this construction that the movement of the tail piece may be accurately regulated.

The many advantages of a tool holder of this construction will be clearly apparent as it will be noted that the same provides a structure which allows for an easy and accurate adjustment of the tool without removing the same from the holder or the holder from the machine.

In the form shown in Fig. 6 the tool holder consists of the spherical member 32 which is slotted to receive the tool 42, the sleeve 33 contacting with the tool holder to maintain the tool against displacement. The spherical member 32 is formed with the tail piece 34 which is offset from the member and which is actuated by the screw 35 in the same manner as in the preferred form. The member 32 is maintained against rotation by the key 36 which is seated in the head 37, the same extending within the slot 38 in the member.

In the form shown in Fig. 7 the spherical member 39 is formed with the slotted tool receiving member 40 which receives a nut as in the preferred form.

What is claimed is:

1. A tool holder consisting of a head, said head being formed with a screw threaded extension, rounded extensions formed integral with said head, a sleeve, the upper interior portion of which is screw threaded, a tool holder mounted between said rounded extensions, a tail piece formed integral with said tool holder and offset from the same, said tail piece being formed with a screw threaded extension and a screw disposed transversely of said head, said screw engaging the screw threaded extension of the tail piece to move the same laterally within the head.

2. A tool holder consisting of a head, said head being formed with extensions, a tool holder disposed between said extensions, a sleeve embracing said extension and a portion of said head, said head being provided with means for limiting the movement of said sleeve, a screw disposed transversely of said head, said tool holder being formed with a threaded extension, said screw being adapted to engage said screw threaded extension to move said extension transversely of said head.

In testimony that I claim the foregoing as my own, I have hereto affixed my signature in the presence of two witnesses.

ROBERT C. NEVIN.

Witnesses:
ADELBERT MOSHER,
DAN HELLER.

Copies of this patent may be obtained for five cents each, by addressing the "Commissioner of Patents, Washington, D. C."